(12) United States Patent
Kelley et al.

(10) Patent No.: US 6,322,918 B1
(45) Date of Patent: Nov. 27, 2001

(54) WATER MANAGEMENT SYSTEM FOR FUEL CELLS

(75) Inventors: Ronald J. Kelley, Coral Springs; Steven D. Pratt; Sivakumar Muthuswamy, both of Plantation; Robert W. Pennisi, Boca Raton, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/419,508

(22) Filed: Oct. 18, 1999

(51) Int. Cl.[7] ................................................ H01M 8/04
(52) U.S. Cl. ................................................ 429/17; 429/38
(58) Field of Search ........................... 429/13, 17, 38

(56) References Cited

U.S. PATENT DOCUMENTS

| 4,037,024 | 7/1977 | Landau | 429/17 |
|---|---|---|---|
| 5,366,818 | 11/1994 | Wilkinson et al. | 429/13 |
| 5,480,735 | * 1/1996 | Landsman | 429/13 |
| 6,007,932 | * 12/1999 | Steyn | 429/31 |
| 6,024,848 | * 2/2000 | Dufner | 204/252 |
| 6,048,383 | * 4/2000 | Breault | 95/44 |
| 6,083,638 | * 7/2000 | Taniguchi | 429/34 |

* cited by examiner

Primary Examiner—Gabrielle Brouillette
Assistant Examiner—Mark Ruthkosky
(74) Attorney, Agent, or Firm—Dale W. Dorinski; Frank M. Scutch, II

(57) ABSTRACT

A water management system reduces the problems with flooding and also enhances the flow of fuel gas to the anodes. Individual unit cells (20) in an array are separated by cell walls (24), the array is covered by a fuel manifold (36), and the manifold is arranged so that the individual unit cells have their own respective chambers. Each chamber is arranged so that the fuel gas flows from one chamber into another through an opening or vent (35) in the chamber wall. The opening contains a hydrophobic portion (38) that serves to urge liquid water that accumulates in the opening to migrate away.

9 Claims, 2 Drawing Sheets

WATER MANAGEMENT SYSTEM FOR FUEL CELLS

TECHNICAL FIELD

This invention relates in general to fuel cells, and in particular, to water management for fuel cells having a solid electrolyte.

BACKGROUND

Fuel cells are electrochemical cells in which a free energy change resulting from a fuel oxidation reaction is converted into electrical energy. A typical fuel cell consists of a fuel electrode (anode) and an oxidant electrode (cathode), separated by an ion-conducting polymer electrolyte. The electrodes are connected electrically to a load (such as an electronic circuit) by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. Gaseous hydrogen is the fuel of choice for most applications, because of its high reactivity in the presence of suitable catalysts and because of its high energy density. Similarly, the most common oxidant is gaseous oxygen, which is readily and economically available from the air. At the anode, incoming hydrogen gas ionizes to produce hydrogen ions and electrons. Since the electrolyte is a non-electronic conductor, the electrons flow away from the anode via the metallic external circuit. At the cathode, oxygen gas reacts with the hydrogen ions migrating through the electrolyte and the incoming electrons from the external circuit to produce water as a byproduct. The byproduct water is typically extracted as vapor. The overall reaction that takes place in the fuel cell is the sum of the anode and cathode reactions, with part of the free energy of reaction released directly as electrical energy. Some of the energy is produced as heat.

In practice, a number of unit cells are normally stacked or 'ganged' together to form a fuel cell assembly. The individual cells are typically electrically connected in series. Fuel and oxidant are introduced through manifolds into respective chambers. One style of fuel cell is a side-by-side air breathing configuration in which a number of individual cells are placed next to each other in a planar arrangement (see, for example, U.S. Pat. No. 5,783,324). Air breathing fuel cells do not rely on forced flow of oxidant or air past the cathodes, but instead utilize the ambient air and rely on natural convection in the surrounding environment. A classical problem with air breathing planar fuel cells is water management. Since the byproduct water is produced at the cathode (air side), it normally evaporates away during operation. However, under heavy loads, the evaporation rate lags the rate of formation and water tends to migrate back through the polymer electrolyte to the anode side. Some spots on the planar fuel cell are cooler than others, and the $H_2O$ condenses at these locations into liquid water, flooding both the anode and the cathode, impeding the reactions at the catalyst sites and impeding the flow of hydrogen gas to the anode. Thus, although air breathing fuel cells continue to hold technological promise, they remain a dream that has so far proven to be elusive to the skilled artisan. An improved planar fuel cell that is less complex and less prone to failure would be a significant addition to the field.

DETAILED DESCRIPTION OF THE PREFERRED EMBODIMENT

A system of water management reduces the problems with flooding and also enhances the flow of fuel gas to the anodes. In a planar fuel cell there are a number of unit cells, and each unit cell has an anode side and a cathode side. The unit cells are typically arranged in a plane such that all the anode sides face in the same direction (i.e. on the same side of the planar fuel cell). A fuel manifold covers the anodes, and the manifold is arranged so that the individual unit cells have their own respective chambers, each of the chambers arranged so that the fuel gas flows from one chamber into another. This is accomplished by an opening or vent in the chamber wall. The opening contains a hydrophobic portion that serves to urge any liquid water that accumulates in the opening to migrate away. By keeping the opening free of liquid water drops, the fuel gas can freely move throughout the manifold, thus keeping the fuel cell running at maximum efficiency.

Figure 1:
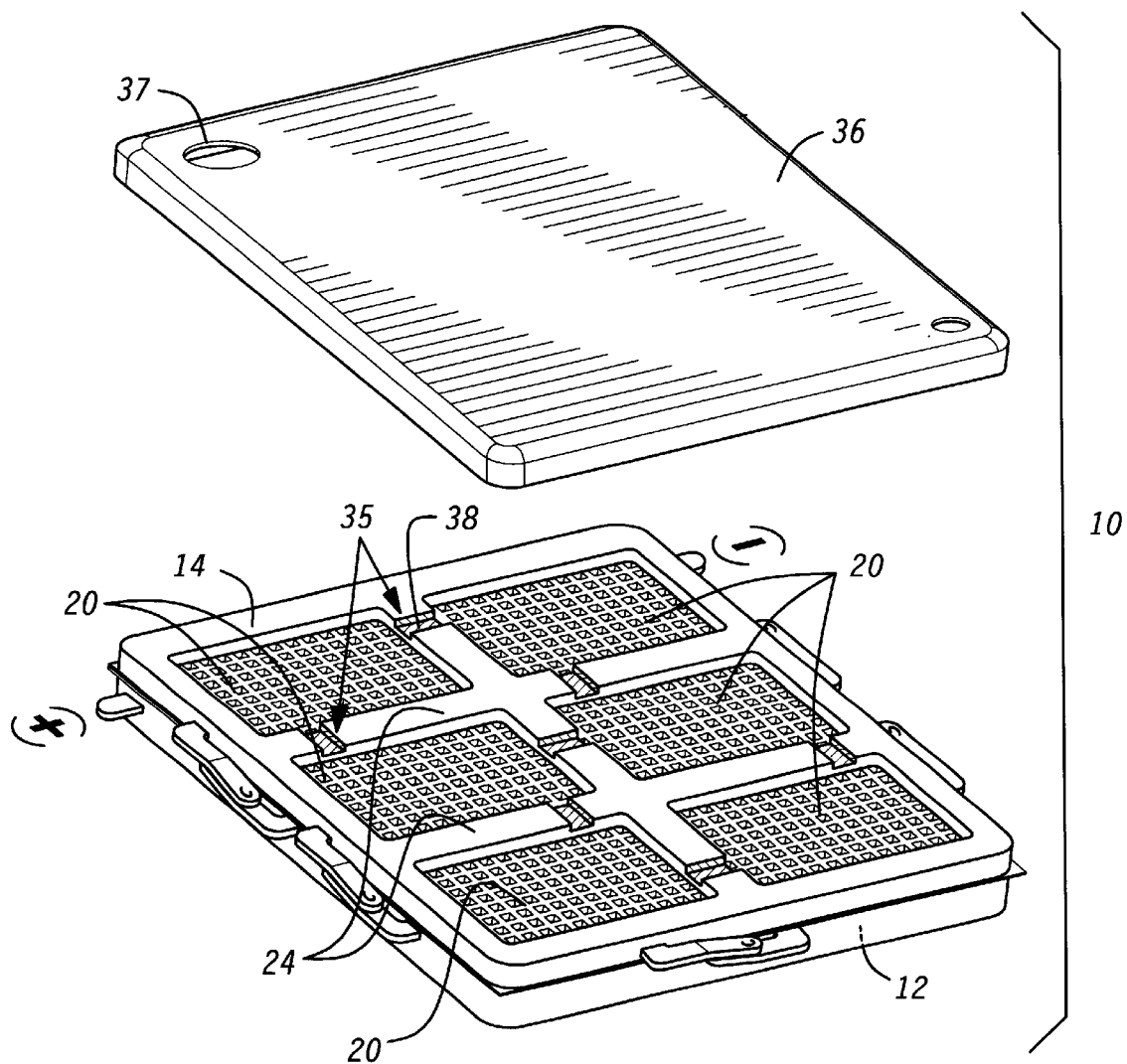
FIG. 1 is an exploded isometric view of a planar fuel cell in accordance with a referred embodiment of the invention.

While the specification concludes with claims defining the features of the invention that are regarded as novel, it is believed that the construction, method of operation and advantages of the invention will be better understood from a consideration of the following description in conjunction with the drawing figures, in which like reference numerals are carried forward. Referring now to FIG. 1, a fuel cell 10 has two sides, a cathode side 12 and an anode side 14. On each side 12 and 14, there are a plurality of individual unit cells 20. The reader will appreciate that each individual unit cell has an anode, cathode, current collector, catalyst, polymer electrolyte, etc. with various of these components disposed on the appropriate side(s). Each unit cell is separated from adjacent unit cells by one or more walls 24. These cell walls 24 create a manifold, serving to physically isolate the unit cells, and in some designs, to prevent the unit cell from electrically shorting to the adjacent cell. The walls 24 typically have a passage, opening or aperture 35 in them so as to allow gas to pass from one unit cell to another. Note, that when assembled, the fuel cell 10 also has a manifold cover 36 with a 10 fuel inlet 37, the manifold cover serving to trap the fuel gas substantially at the surface of the anodes. In practice, the hydrogen gas is admitted to the inlet 37 and the manifold is pressurized to a desired level. There is no outlet or vent for the hydrogen gas, so the fuel cell is said to be 'dead-ended'. One can see that the apertures 35 allow the hydrogen gas to be equally distributed to all the unit cells 20, and that as the hydrogen is catalyzed to hydrogen ions that migrate through the polymer electrolyte membrane to produce electricity and water, the hydrogen in the manifold is consumed, thus lowering the pressure and allowing a pressure regulator (not shown) to admit additional hydrogen gas to maintain the desired pressurization.

During operation of the fuel cell, the internal resistance of the system produces heat. This heat evaporates the byproduct water that is produced on or in the membrane electrolyte, creating a very humid environment, and the water vapor or gaseous $H_2O$ condenses on the cooler portions of the fuel cell. In 'dead-ended' systems the hydrogen gas is not constantly vented to atmosphere, that is, it does not continuously flow through the gas channels on the anode side, but is only replenished as the equilibrium is disturbed by consumption of hydrogen. As noted above, since air breathing fuel cells do not utilize forced air flow across the cathode, in some situations (e.g. heavy electrical load) the byproduct water is not removed fast enough and not only causes problems at the cathode catalyst sites, but it begins to migrate back through the polymer electrolyte membrane and to 'flood' the anode side. When this excess water accumulates around or in the narrow passages 35, it can easily block the flow of hydrogen through the system and may cut off the access of new fuel to the downstream cells, adversely affecting the performance of the entire fuel cell system. As the size of fuel cells decreases, the accompanying dimensions of all components also decrease, and in fuel cells for small portable electronic applications, the apertures 35 are typically small enough that the smallest of water droplets can cause significant problems.

One way to prevent the accumulation of water in the passages is to make the passages hydrophobic. In our invention, a hydrophobic layer 38 is added to the fuel manifold in the areas where the gas passages constrict or neck down, and also to other areas that are prone to water droplet formation. The hydrophobic treatment aids in water management of the fuel cell system by preventing the accumulation of water droplets at critical locations or by forcing the water drops to other areas where they can be evaporated or where they will not cause problems. The hydrophobic surfaces reduce the surface friction at the narrow regions. Polytetrafluoroethylene is the most common hydrophobic material, but other fluorinated polymers or molecules having a hydrophobic endgroup can also be used with effectiveness. For example, a soap-like chemical having a hydrophilic endgroup that attaches easily to the cell walls and a hydrophobic endgroup that mitigates the formation of water drops can be used. In addition to coatings, the apertures can be 'plugged' with open cell fluorinated foams so as to permit the passage of gas and prevent the buildup of water drops.

Figure 2:
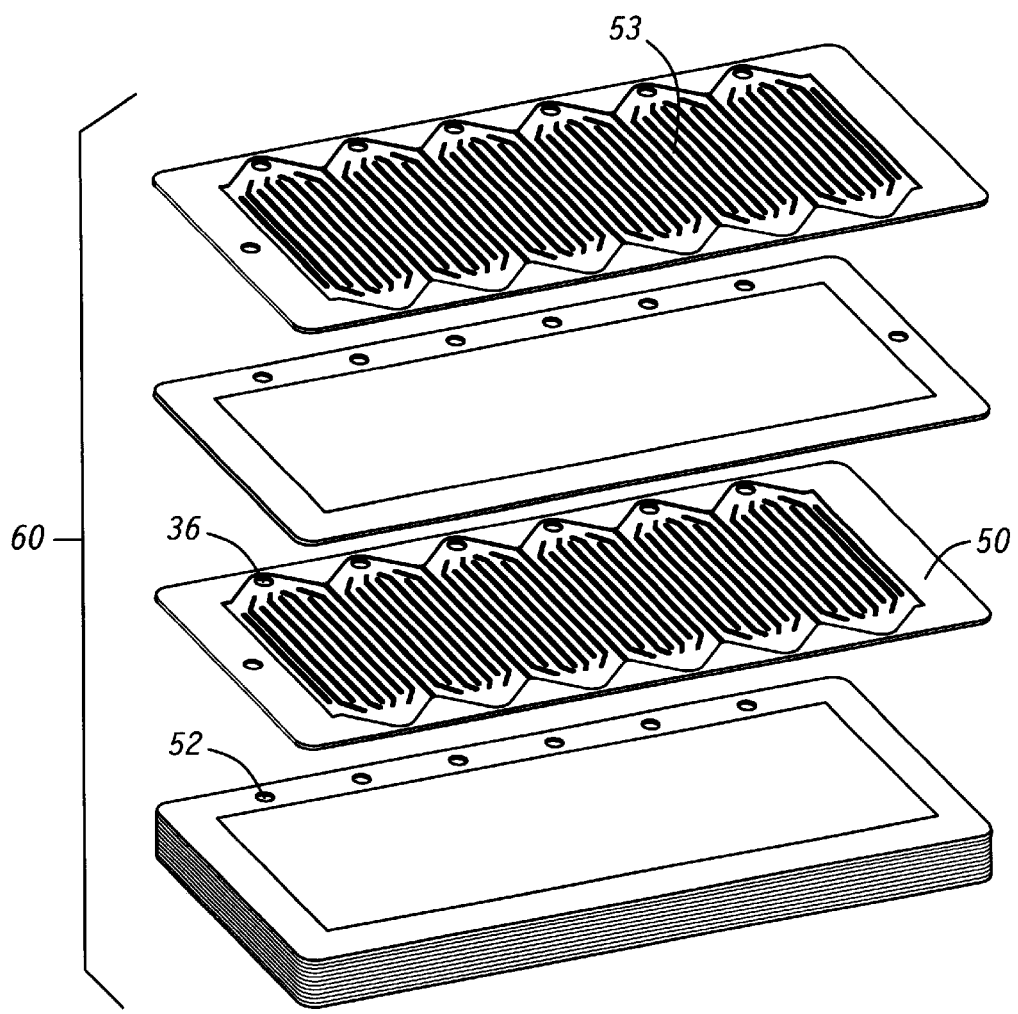
FIG. 2 is an exploded isometric view of a stacked fuel cell in accordance with an alternate embodiment of the invention.

Although we believe our invention will find the most application in dead-ended planar fuel cells, we also realize that it can be used in conventional stacked fuel cells that have bipolar plates. Referring now to FIG. 2, the openings 36 in the bipolar plate 50 that allow the hydrogen gas to flow from one unit cell in the stack to the next unit cell are similarly coated with a hydrophobic material or plugged with hydrophobic foam. In addition, other strategic locations 52, 53 in the stack 60 can also be treated to prevent water buildup.

In summary, the use of a hydrophobic coating material on critical surfaces in a fuel cell system aids in water management by preventing the buildup of water drops that can impede or stop the flow of fuel gas to the individual unit cells. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, channels on the cathode side could also be coated with a hydrophobic coating in systems that use and air manifold, forced air, or any other pressurized fuel cell where there is a flow of oxidant.

What is claimed is:

1. A water management system for fuel cells, comprising:
    a planar fuel cell comprising a plurality of unit cells, each unit cell having an anode side and a cathode side, the plurality of unit cells arranged in a plane such that each unit cell is separated from a neighboring unit cell by one or more walls;
    the walls having one or more apertures therein, to permit passage of a gas from one unit cell to a neighboring unit cell; and
    the apertures having a hydrophobic portion, said hydrophobic portion serving to aid in water management of the planar fuel cell.

2. The water management system for fuel cells as described in claim 1, wherein each of said plurality of unit cells is arranged such that all anode sides are on the same side of the planar fuel cell.

3. The water management system for fuel cells as described in claim 1, wherein the gas comprises hydrogen.

4. The water management system for fuel cells as described in claim 1, wherein the hydrophobic portion comprises a hydrophobic material.

5. The water management system for fuel cells as described in claim 4, wherein the hydrophobic material comprises a porous foam.

6. The water management system for fuel cells as described in claim 5, wherein the porous foam fills at least a portion of the aperture.

7. The water management system for fuel cells as described in claim 4, wherein the hydrophobic material comprises a coating on an aperture wall.

8. The water management system for fuel cells as described in claim 4, wherein the hydrophobic material comprises polytetrafluoroethylene.

9. A water management system for fuel cells, comprising:
    a planar fuel cell comprising a plurality of unit cells, each unit cell having an anode side and a cathode side, the plurality of unit cells arranged in a plane such that all anode sides are on the same side of the planar fuel cell and such that the anode of each unit cell resides in a fuel chamber, the fuel chamber isolating the anodes of each unit cell from a neighboring unit cell anode;
    the fuel chambers having one or more apertures therein, to permit passage of hydrogen gas to all the fuel chambers and to permit passage of water;
    the apertures having a hydrophobic portion, said hydrophobic portion serving to induce liquid water that accumulates in the aperture to move out of the aperture.

* * * * *